United States Patent [19]

Le et al.

[11] Patent Number: 5,232,580

[45] Date of Patent: Aug. 3, 1993

[54] CATALYTIC PROCESS FOR HYDROCARBON CRACKING USING SYNTHETIC MESOPOROUS CRYSTALLINE MATERIAL

[75] Inventors: Quang N. Le, Cherry Hill; Robert T. Thomson, Voorhees, both of N.J.

[73] Assignee: Mobil Oil Corporation, Fairfax, Va.

[21] Appl. No.: 719,205

[22] Filed: Jun. 21, 1991

[51] Int. Cl.$^5$ .............................................. C10G 11/05
[52] U.S. Cl. ...................... 208/114; 208/113; 208/118; 208/119; 208/120; 208/70
[58] Field of Search ................. 208/70, 113, 118, 114, 208/119, 120

[56] References Cited

U.S. PATENT DOCUMENTS

| | | | |
|---|---|---|---|
| 3,884,835 | 5/1975 | Vaughan | 252/451 |
| 4,091,079 | 5/1978 | Vaughan | 423/328 |
| 4,310,440 | 1/1982 | Wilson et al. | 252/435 |
| 4,673,559 | 6/1987 | Derouane et al. | 423/306 |
| 4,791,088 | 12/1988 | Chu et al. | 502/232 |
| 4,880,611 | 11/1989 | von Ballmoos et al. | 423/306 |
| 4,969,987 | 11/1990 | Le et al. | 208/67 |
| 5,098,684 | 3/1992 | Kresge et al. | 423/277 |
| 5,100,533 | 3/1992 | Le et al. | 208/67 |
| 5,102,643 | 4/1992 | Kresge et al. | 423/328 |
| 5,134,241 | 7/1992 | Le et al. | 585/332 |
| 5,134,242 | 7/1992 | Le et al. | 585/533 |

FOREIGN PATENT DOCUMENTS 92305140.3 9/1992 European Pat. Off. .

OTHER PUBLICATIONS

"An X-Ray structural study of cacoxenite, a mineral phosphate", Paul B. Moore, Nature, vol. 306, 24 Nov. 1983.

*Primary Examiner*—Theodore Morris
*Assistant Examiner*—Walter D. Griffin
*Attorney, Agent, or Firm*—Alexander J. McKillop; Malcolm D. Keen; L. G. Wise

[57] ABSTRACT

A process for naphtha cracking employing new synthetic catalyst of ultra-large pore crystalline material. The new crystalline material exhibits unusually large sorption capacity demonstrated by its benzene adsorption capacity of greater than about 15 grams benzene/100 grams at 50 torr and 25° C., a hexagonal electron diffraction pattern that can be indexed with a $d_{100}$ value greater than about 18 Angstrom Units and a hexagonal arrangement of uniformly sized pores with a maximum perpendicular cross section of at least about 13 Angstrom units.

An improved cracking reaction is provided for catalytic conversion of hydrocarbon feedstock which comprises contacting the feedstock under catalytic conversion conditions with acid metallosilicate solid catalyst having the structure of MCM-41 with hexagonal honeycomb lattice structure consisting essentially of uniform pores in the range of about 20 to 100 Angstroms. The cracking reaction is very selective, especially when conducted at temperature of about 425° to 650° C.

28 Claims, No Drawings

CATALYTIC PROCESS FOR HYDROCARBON CRACKING USING SYNTHETIC MESOPOROUS CRYSTALLINE MATERIAL

CROSS-REFERENCE TO RELATED APPLICATIONS

This application is related to U.S. patent application Ser. No. 07/625,245, now U.S. Pat. No. 5,098,684; filed Dec. 10, 1990, which is a continuation-in-part of Ser. No. 07/470,008 now U.S. Pat. No. 5,102,643 (Kresge et al).

FIELD OF THE INVENTION

This invention relates to a catalytic conversion process employing a catalyst composition of synthetic ultra-large pore crystalline material. In particular, it relates to cracking of hydrocarbons, such as petroleum naphtha, with a new type of acid catalyst material.

BACKGROUND OF THE INVENTION

This invention provides for improved production of high octane fuel from naphtha by hydrocarbon cracking to obtain C5-olefins, particularly isobutene and isoamylenes, for upgrading by etherification, alkylation or the like. In particular, it provides methods and catalysts for cracking $C_7+$ paraffinic and naphthenic feedstocks, such as naphthenic petroleum fractions, under selective reaction conditions to produce etherifiable isoalkenes.

There has been considerable development of processes for synthesizing alkyl tertiary-alkyl ethers as octane boosters in place of conventional lead additives in gasoline. The etherification processes for the production of methyl tertiary alkyl ethers, in particular methyl t-butyl ether (MTBE) and t-amyl methyl ether (TAME) have been the focus of considerable research. It is known that isobutylene (i-butene) and other isoalkenes (branched olefins) produced by hydrocarbon cracking may be reacted with methanol, ethanol, isopropanol and other lower aliphatic primary and secondary alcohols over an acidic catalyst to provide tertiary ethers. Methanol is considered the most important $C_1$-$C_4$ oxygenate feedstock because of its widespread availability and low cost. Therefore, primary emphasis herein is placed on MTBE and TAME and cracking processes for making isobutylene and isoamylene reactants for etherification.

Naphtha reforming, in which $C_6+$ paraffins and naphthenes are converted to aromatics, provides a major source of high octane gasoline in current refining strategies. However, due to environmental constraints, replacement of aromatic-rich reformate with high octane ethers and alkylate would be highly desirable. Since these latter processes require feedstocks such as $C_3$-$C_5$ olefins and isoparaffins, a means of selectively converting naphtha to lighter hydrocarbons would be very beneficial. A major drawback to the cracking naphtha to obtain these lighter feedstocks is the concurrent formation of light gas ($C_1$-$C_2$) and linear $C_3$-$C_5$ paraffins, which are low value by-products. Therefore, development of a catalyst which maximizes the yield of $C_3$-$C_5$ olefins and isoparaffins during naphtha cracking would be highly desirable.

SUMMARY OF THE INVENTION

The present invention pertains to the use of ultra-large pore materials, such as recently discovered mesoporous MCM-41, as selective catalysts for the cracking of naphtha (e.g., straight run naphtha, HDC naphtha, Udex raffinate, etc.). Compared to zeolites such as medium-pore ZSM-5 or MCM-22 zeolites, the recently discovered ultra large pore catalysts show greater selectivity for the formation of C5- olefins from naphtha conversion. Use of ultra large pore catalysts for naphtha cracking improves the yield of C5- olefinic products which may be used in downstream processes, such as alkylation and etherification, to produce high octane "clean fuel".

In the preferred embodiments, a novel process and operating technique is provided for upgrading paraffinic and naphthenic naphtha to high octane fuel with mesoporous catalyst. The primary reaction for the conversion of naphtha is affected by contacting a fresh naphtha feedstock stream containing a major amount of $C_7+$ paraffins, such as alkanes and naphthenes, with mesoporous pore acid cracking catalyst under low pressure selective cracking conditions effective to produce at least 10 wt % selectivity C4-C5 isoalkene. Selectivity to desirable tertiary aliphatic hydrocarbons is enhanced by employing partial conversion conditions, preferably a contact time of about 0.5 to less than 10 seconds. The primary short contact time reaction step is followed by separating the cracking effluent to obtain a light olefinic fraction rich in C4-C5 isoalkene and a $C_6+$ liquid fraction of enhanced octane value. By etherifying the C4-C5 isoalkene fraction catalytically with lower alcohol (i.e., C1-C4 aliphatic alcohol), a valuable tertiary-alkyl ether product is made. Preferably, the cracking catalyst is a new metallosilicate MCM-41 having Bronsted acid activity to optimize selectivity of intermediate C4-C5 tertiary aliphatic hydrocarbons.

DESCRIPTION OF SPECIFIC EMBODIMENTS

Catalyst Synthesis and Composition

Recent developments in catalyst technology have provided a group of mesoporous siliceous materials having novel pore geometry. These materials are characterized by substantially uniform hexagonal honeycomb microstructure, with uniform pores having a cell diameter greater than 13 Angstrom units, (preferably in the mesoporous range of about 20–100 A). Most prominent among these ultra-large pore size materials is a new metallosilicate called MCM-41, which is usually synthesized with Bronsted acid active sites by incorporating a tetrahedrally coordinated trivalent element, such as Al, Ga, B, or Fe, within the silicate framework. Aluminosilicate materials of this type are thermally and chemically stable, properties favored for acid catalysis; however, the advantages of mesoporous structures may be utilized by employing highly siliceous materials or crystalline metallosilicate having one or more tetrahedral species having varying degrees of acidity. In addition to the preferred aluminosilicates, the gallosilicate, ferrosilicate and borosilicate materials may be employed. Although matrices may be formed with the germanium analog of silicon, these are expensive and generally no better than the metallosilicates.

MCM-41 crystalline structure is readily recognized by its spectrographic characteristics, such as electron micrograph, X-ray diffraction pattern, absorption properties, etc., as described in U.S. patent application No. 07/625,245 (Vartuli et al./Docket 5657S), now U.S. Pat. No. 5,098,684.

The catalysts preferred for use herein include the ultra-large pore crystalline aluminosilicates having a silica-to-alumina ratio of about 5:1 to 1000:1 and significant Bronsted acid activity. Acid activity may be measured by acid cracking activity or ammonia absorption properties, such as temperature programmed desorption.

In discussing tetrahedrally coordinated metal oxides of the zeolitic type, it is understood that adjacent metal sites in the matrix are linked by oxygen (i.e., —Si—O—Si—). The honeycomb microstructure of MCM-41 and related mesoporous materials may include several moieties interconnected in a three dimensional matrix or lattice having large hexagonal channels therein forming the ultralarge pores of the catalyst. The repeating units forming the large ring structure of the lattice vary with pore size. A typical catalyst component having Bronsted acid sites consists essentially of crystalline aluminosilicate having the structure of MCM-41, optionally containing 5 to 95 wt. % silica, clay and/or alumina binder. These siliceous materials may be employed in their acid form, ion-exchanged or impregnated with one or more suitable metals, such as Ga, Pd, Zn, Ni, Co and/or other metals of Periodic Groups IIIA to VIIIA and IB to IIB (IUPAC). In the description of preferred embodiments catalyst particles consist essentially of pelletized H-MCM-41 (hydrogen form) catalyst.

The inorganic, non-layered mesoporous crystalline catalytic material employed in this invention has the following composition:

$$M_{n/q}(W_a X_b Y_c Z_d O_h);$$

wherein W is a divalent element, such as a divalent first row transition metal, e.g. manganese, cobalt and iron, and/or magnesium, preferably cobalt; X is a trivalent element, such as aluminum, boron, iron and/or gallium, preferably aluminum; Y is a tetravalent element such as silicon and/or germanium, preferably silicon; Z is a pentavalent element, such as phosphorus; M is one or more ions, such as, for example, ammonium, Group IA, IIA and VIIB ions, usually hydrogen, sodium and/or fluoride ions; n is the charge of the composition excluding M expressed as oxides; q is the weighted molar average valence of M; n/q is the number of moles or mole fraction of M; a, b, c, and d are mole fractions of W, X, Y and Z, respectively; h is a number of from 1 to 2.5; and (a+b+c+d) =1.

A preferred embodiment of the above crystalline material is when (a+b+c) is greater than d, and h=2. A further embodiment is when a and d=0, and h=2.

In the as-synthesized form, the material of this invention has a composition, on an anhydrous basis, expressed empirically as follows:

$$rRMM_{n/q}(W_a X_b Y_c Z_d O_h);$$

wherein R is the total organic material not included in M as an ion, and r is the coefficient for R, i.e. the number of moles or mole fraction of R.

The M and R components are associated with the material as a result of their presence during crystallization, and are easily removed or, in the case of M, replaced by post-crystallization methods hereinafter more particularly described. To the extent desired, the original M, e.g. sodium or chloride, ions of the as-synthesized material of this invention can be replaced in accordance with techniques well known in the art, at least in part, by ion exchange with other ions. Preferred replacing ions include metal ions, hydrogen ions, hydrogen precursor, e.g. ammonium, ions and mixtures thereof. Particularly preferred ions are those which tailor the catalytic activity for certain hydrocarbon conversion reactions. These include hydrogen, rare earth metals and metals of Groups IA (e.g. K), IIA (e.g. Ca), VIIA (e.g. Mn), VIIIA (e.g. Ni),IB (e.g. Cu), IIB (e.g. Zn), IIIB (e.g. In), IVB (e.g. Sn), and VIIB (e.g. F) of the IUPAC Periodic Table of the Elements.

The crystalline (i.e. meant here as having sufficient order to provide a diffraction pattern such as, for example, by X-ray, electron or neutron diffraction, following calcination with at least one peak) mesoporous material of this invention may be characterized by its heretofore unknown structure, including extremely large pore windows, and high sorption capacity. The term "mesoporous" is used here to indicate crystals having uniform pores within the range of from about 13 Angstroms to about 200 Angstroms. The materials of this invention will have uniform pores within the range of from about 13 Angstroms to about 200 Angstroms, more usually from about 15 Angstroms to about 100 Angstroms. For the purposes of this application, a working definition of "porous" is a material that adsorbs at least 1 gram of a small molecule, such as Ar, $N_2$, n-hexane or cyclohexane, per 100 grams of the solid.

The material of the present invention can be distinguished from other porous inorganic solids by the regularity of its large open pores, whose pore size more nearly resembles that of amorphous or paracrystalline materials, but whose regular arrangement and uniformity of size (pore size distribution within a single phase of, for example, ±25%, usually ±15% or less of the average pore size of that phase) resemble more those of crystalline framework materials such as zeolites. The material appears to have a hexagonal arrangement of large open channels that can be synthesized with open internal diameters from about 13 Angstroms to about 200 Angstroms. The term "hexagonal" is intended to encompass not only materials that exhibit mathematically perfect hexagonal symmetry within the limits of experimental measurement, but also those with significant observable deviations from that ideal state. A working definition as applied to the microstructure of the present invention would be that most channels in the material would be surrounded by six nearest neighbor channels at roughly the same distance. Defects and imperfections will cause significant numbers of channels to violate this criterion to varying degrees, depending on the quality of the material's preparation. Samples which exhibit as much as ±25% random deviation from the average repeat distance between adjacent channels still clearly give recognizable images of the present ultra-large pore materials. Comparable variations are also observed in the $d_{100}$ values from the electron diffraction patterns.

The most regular preparations of the material of the present invention give an X-ray diffraction pattern with a few distinct maxima in the extreme low angle region. The positions of these peaks approximately fit the positions of the hk0 reflections from a hexagonal lattice. The X-ray diffraction pattern, however, is not always a sufficient indicator of the presence of these materials, as the degree of regularity in the microstructure and the extent of repetition of the structure within individual particles affect the number of peaks that will be observed. Indeed, preparations with only one distinct peak in the low angle region of the X-ray diffraction pattern have been found to contain substantial amounts of the material in them. Other techniques to illustrate the microstructure of this material are transmission electron microscopy and electron diffraction. Properly oriented specimens of the material show a hexagonal arrangement of large channels and the corresponding electron diffraction pattern gives an approximately hexagonal arrangement of diffraction maxima. The $d_{100}$ spacing of the electron diffraction patterns is the distance between adjacent spots on the hk0 projection of the hexagonal lattice and is related to the repeat distance aO between channels observed in the electron micrographs through the formula $$d_{100} = a_0 \sqrt{3/2}.$$

This $d_{100}$ spacing observed in the electron diffraction patterns corresponds to the d-spacing of a low angle peak in the X-ray diffraction pattern of the material. The most highly ordered preparations of the material obtained so far have 20–40 distinct spots observable in the electron diffraction patterns. These patterns can be indexed with the hexagonal hk0 subset of unique reflections of 100, 110, 200, 210, etc., and their symmetry-related reflections.

In its calcined form, the crystalline material of the invention may be further characterized by an X-ray diffraction pattern with at least one peak at a position greater than about 18 Angstrom Units d-spacing (4.909 degrees two-theta for Cu K-alpha radiation) which corresponds to the $d_{100}$ value of the electron diffraction pattern of the material, and an equilibrium benzene adsorption capacity of greater than about 15 grams benzene/100 grams crystal at 50 torr and 25° C. (basis: crystal material having been treated in an attempt to insure no pore blockage by incidental contaminants, if necessary).

The equilibrium benzene adsorption capacity characteristic of this material is measured on the basis of no pore blockage by incidental contaminants. For instance, the sorption test will be conducted on the crystalline material phase having any pore blockage contaminants and water removed by ordinary methods. Water may be removed by dehydration techniques, e.g. thermal treatment. Pore blocking inorganic amorphous materials, e.g. silica, and organics may be removed by contact with acid or base or other chemical agents such that the detrital material will be removed without detrimental effect on the crystal of the invention.

More particularly, the calcined crystalline non-layered material of the invention may be characterized by an X-ray diffraction pattern with at least two peaks at positions greater than about 10 Angstrom Units d-spacing (8.842 degrees two-theta for Cu K-alpha radiation), at least one of which is at a position greater than about 18 Angstrom Units d-spacing, and no peaks at positions less than about 10 Angstrom units d-spacing with relative intensity greater than about 20% of the strongest peak. Still more particularly, the X-ray diffraction pattern of the calcined material of this invention will have no peaks at positions less than about 10 Angstrom units d-spacing with relative intensity greater than about 10% of the strongest peak. In any event, at least one peak in the X-ray diffraction pattern will have a d-spacing that corresponds to the $d_{100}$ value of the electron diffraction pattern of the material.

Still more particularly, the calcined inorganic, non-layered crystalline material of the invention is characterized as having a pore size of about 13 Angstroms or greater as measured by physisorption measurements, hereinafter more particularly set forth. Pore size is considered a maximum perpendicular cross-section pore dimension of the crystal.

X-ray diffraction data were collected on a Scintag PAD X automated diffraction system employing theta-theta geometry, Cu K-alpha radiation, and an energy dispersive X-ray detector. Use of the energy dispersive X-ray detector eliminated the need for incident or diffracted beam monochromators. Both the incident and diffracted X-ray beams were collimated by double slit incident and diffracted collimation systems. The slit sizes used, starting from the X-ray tube source, were 0.5, 1.0, 0.3 and 0.2 mm, respectively. Different slit systems may produce differing intensities for the peaks. The materials of the present invention that have the largest pore sizes may require more highly collimated incident X-ray beams in order to resolve the low angle peak from the transmitted incident X-ray beam.

The diffraction data were recorded by step-scanning at 0.04 degrees of two-theta, where theta is the Bragg angle, and a counting time of 10 seconds for each step. The interplanar spacings, d's, were calculated in Angstrom units (A), and the relative intensities of the lines, $I/I_o$, where $I_o$ is one-hundredth of the intensity of the strongest line, above background, were derived with the use of a profile fitting routine. The intensities were uncorrected for Lorentz and polarization effects. The relative intensities are given in terms of the symbols vs=very strong (75–100), s=strong (50–74), m=medium (25–49) and w=weak (0–24). It should be understood that diffraction data listed as single lines may consist of multiple overlapping lines which under certain conditions, such as very high experimental resolution or crystallographic changes, may appear as resolved or partially resolved lines. Typically, crystallographic changes can include minor changes in unit cell parameters and/or a change in crystal symmetry, without a substantial change in structure. These minor effects, including changes in relative intensities, can also occur as a result of differences in cation content, framework composition, nature and degree of pore filling, thermal and/or hydrothermal history, and peak width/shape variations due to particle size/shape effects, structural disorder or other factors known to those skilled in the art of X-ray diffraction.

The equilibrium benzene adsorption capacity is determined by contacting the material of the invention, after dehydration or calcination at, for example, about 540° C. for at least about one hour and other treatment, if necessary, in an attempt to remove any pore blocking contaminants, at 25° C. and 50 torr benzene until equilibrium is reached. The weight of benzene sorbed is then determined as more particularly described hereinafter.

When used as a sorbent or catalyst component, the composition of the invention should be subjected to treatment to remove part or all of any organic constituent. The present composition can also be used as a catalyst component in intimate combination with a hydrogenating component such as tungsten, vanadium, molybdenum, rhenium, nickel, cobalt, chromium, manganese, or a noble metal such as platinum or palladium or mixtures thereof where a hydrogenation-dehydrogenation function is to be performed. Such component can be in the composition by way of co-crystallization, exchanged into the composition to the extent a Group IIIB element, e.g. aluminum, is in the structure, impregnated therein or intimately physically admixed therewith. Such component can be impregnated in or on to it such as, for example, by, in the case of platinum, treating the silicate with a solution containing a platinum metal-containing ion. Thus, suitable platinum compounds for this purpose include chloroplatinic acid, platinous chloride and various compounds containing the platinum amine complex.

The above crystalline material, especially in its metal, hydrogen and ammonium forms can be beneficially converted to another form by thermal treatment (calcination). This thermal treatment is generally performed by heating one of these forms at a temperature of at least 400° C. for at least 1 minute and generally not longer than 20 hours, preferably from about 1 to about 10 hours. While subatmospheric pressure can be employed for the thermal treatment, atmospheric pressure is desired for reasons of convenience, such as in air, nitrogen, ammonia, etc. The thermal treatment can be performed at a temperature up to about 750° C. The thermally treated product is particularly useful in the catalysis of certain hydrocarbon conversion reactions.

The crystalline material of this invention, when employed either as an adsorbent or as a catalyst component in an organic compound conversion process should be dehydrated, at least partially. This can be done by heating to a temperature in the range of 200° C. to 595° C. in an atmosphere such as air, nitrogen, etc. and at atmospheric, subatmospheric or superatmospheric pressures for between 30 minutes and 48 hours. Dehydration can also be performed at room temperature merely by placing the composition in a vacuum, but a longer time is required to obtain a sufficient amount of dehydration.

The present crystalline material can be prepared by one of several methods, each with particular limitations.

A first method involves a reaction mixture having an $X_xO_3/YO_2$ mole ratio of from 0 to about 0.5, but an $Al_2O_3/SiO_2$ mole ratio of from 0 to 0.01, a crystallization temperature of from about 25° C. to about 250° C., preferably from about 50° C. to about 175° C., and an organic directing agent, hereinafter more particularly described, or, preferably a combination of that organic directing agent plus an additional organic directing agent, hereinafter more particularly described. This first method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, an organic (R) directing agent, hereinafter more particularly described, and a solvent or solvent mixture, such as, for example, $C_1$-$C_6$ alcohols, $C_1$-$C_6$ diols and/or water, especially water, said reaction mixture having a composition, in terms of mole ratios of oxides, within the following ranges:

| Reactants | Useful | Preferred |
| --- | --- | --- |
| $X_2O_3/YO_2$ | 0 to 0.5 | 0.001 to 0.5 |
| $Al_2O_3/SiO_2$ | 0 to 0.01 | 0.001 to 0.01 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.01 to 2.0 | 0.03 to 1.0 | wherein e and f are the weighted average valences of M and R, respectively.

In this first method, when no Z and/or W oxides are added to the reaction mixture, the pH is important and must be maintained at from about 9 to about 14. When Z and/or W oxides are present in the reaction mixture, the pH is not narrowly important for synthesis of the present crystalline material. In this, as well as the following methods for synthesis of the present material the $R_{2/f}O/(YO_2+WO+Z_2O_5+X_2O_3)$ ratio is important. When this ratio is less than 0.01 or greater than 2.0, impurity products tend to be synthesized at the expense of the present material.

A second method for synthesis of the present crystalline material involves a reaction mixture having an $X_2O_3/YO_2$ mole ratio of from about 0 to about 0.5, a crystallization temperature of from about 25° C. to about 250° C., preferably from about 50° C. to about 175° C., and two separate organic directing agents, i.e. the organic and additional organic directing agents, hereinafter more particularly described. This second method comprises preparing a reaction mixture containing sources of, for example, alkali or alkaline earth metal (M), e.g. sodium or potassium, cation if desired, one or a combination of oxides selected from the group consisting of divalent element W, e.g. cobalt, trivalent element X, e.g. aluminum, tetravalent element Y, e.g. silicon, and pentavalent element Z, e.g. phosphorus, a combination of organic directing agent and additional organic directing agent (R), each hereinafter more particularly described, and a solvent or solvent mixture, such as, for example, $C_1$-$C_6$ alcohols, $C_1$-$C_6$ diols and/or water, especially water, said reaction mixture having a composition, in terms of mole ratios of oxides, within the following ranges:

| Reactants | Useful | Preferred |
| --- | --- | --- |
| $X_2O_3/YO_2$ | 0 to 0.5 | 0.001 to 0.5 |
| $X_2O_3/(YO_2 + Z_2O_5)$ | 0.1 to 100 | 0.1 to 20 |
| $X_2O_3/(YO_2 + WO + Z_2O_5)$ | 0.1 to 100 | 0.1 to 20 |
| Solvent/$(YO_2 + WO + Z_2O_5 + X_2O_3)$ | 1 to 1500 | 5 to 1000 |
| $OH^-/YO_2$ | 0 to 10 | 0 to 5 |
| $(M_{2/e}O + R_{2/f}O)/(YO_2 + WO + Z_2O_5 + X_2O_3)$ | 0.01 to 20 | 0.05 to 5 |
| $M_{2/e}O/(YO_2 + WO + Z_2O_5 + X_2O_3)$ | 0 to 10 | 0 to 5 |
| $R_{2/f}O/(YO_2 + WO + Z_2O_5 + X_2O_3)$ | 0.1 to 2.0 | 0.12 to 1.0 | wherein e and f are the weighted average valences of M and R, respectively.

In this second method, when no Z and/or W oxides are added to the reaction mixture, the pH is important and must be maintained at from about 9 to about 14. When Z and/or W oxides are present in the reaction mixture, the pH is not narrowly important for crystallization of the present invention.

A third method for synthesis of the present crystalline material is where X comprises aluminum and Y comprises silicon, the crystallization temperature must be from about 25° C. to about 175° C., preferably from about 50° C. to about 150° C., and an organic directing agent, hereinafter more particularly described, or, preferably a combination of that organic directing agent plus an additional organic agent, hereinafter more particularly described, is used. This third method comprises preparing a reaction mixture containing sources of, for example, alkali or alkaline earth metal (M), e.g. sodium or potassium, cation if desired, one or more sources of aluminum and/or silicon, an organic (R) directing agent, hereinafter more particularly described, and a solvent or solvent mixture, such as, for example $C_1$–$C_6$ alcohols, $C_1$–$C_6$ diols and/or water, especially water, said reaction mixture having a composition, in terms of mole ratios of oxides, within the following ranges:

| Reactants | Useful | Preferred |
|---|---|---|
| $Al_2O_3/SiO_2$ | 0 to 0.5 | 0.001 to 0.5 |
| Solvent/$SiO_2$ | 1 to 1500 | 5 to 1000 |
| $OH^-/SiO_2$ | 0 to 10 | 0 to 5 |
| $(M_{2/e}O + R_{2/f}O)/(SiO_2 + Al_2O_3)$ | 0.01 to 20 | 0.05 to 5 |
| $M_{2/e}O/(SiO_2 + Al_2O_3)$ | 0 to 5 | 0 to 3 |
| $R_{2/f}O/(SiO_2 + Al_2O_3)$ | 0.01 to 2 | 0.03 to 1 | wherein e and f are the weighted average valences of M and R, respectively.

In this third method, the pH is important and must be maintained at from about 9 to about 14. This method involves the following steps:

(1) Mix the organic (R) directing agent with the solvent or solvent mixture such that the mole ratio of solvent/$R_{2/f}O$ is within the range of from about 50 to about 800, preferably from about 50 to about 500. This mixture constitutes the "primary template" for the synthesis method.

(2) To the primary template mixture of step (1) add the sources of oxides, e.g. silica and/or alumina such that the ratio of $R_{2/f}O/(SiO_2+Al_2O_3)$ is within the range of from about 0.01 to about 2.0.

(3) Agitate the mixture resulting from step (2) at a temperature of from about 20° C. to about 40° C., preferably for from about 5 minutes to about 3 hours.

(4) Allow the mixture to stand with or without agitation, preferably at a temperature of from about 20° C. to about 100° C., and preferably for from about 10 minutes to about 24 hours.

(5) Crystallize the product from step (4) at a temperature of from about 50° C. to about 175° C., preferably for from about 1 hour to about 72 hours. Crystallization temperatures higher in the given ranges are most preferred.

A fourth method for the present synthesis involves the reaction mixture used for the third method, but the following specific procedure with tetraethylorthosilicate the source of silicon oxide:

(1) Mix the organic (R) directing agent with the solvent or solvent mixture such that the mole ratio of solvent/$R_{2/f}O$ is within the range of from about 50 to about 800, preferably from about 50 to about 500. This mixture constitutes the "primary template" for the synthesis method.

(2) Mix the primary template mixture of step (1) with tetraethylorthosilicate and a source of aluminum oxide, if desired, such that the $R_{2/f}O/SiO_2$ mole ratio is in the range of from about 0.5 to about 2.0.

(3) Agitate the mixture resulting from step (2) for from about 10 minutes to about 6 hours, preferably from about 30 minutes to about 2 hours, at a temperature of from about 0° C. to about 25° C., and a pH of less than 12. This step permits hydrolysis/polymerization to take place and the resultant mixture will appear cloudy.

(4) Crystallize the product from step (3) at a temperature of from about 25° C. to about 150° C., preferably from about 95° C. to about 110° C., for from about 4 to about 72 hours, preferably from about 16 to about 48 hours.

In each of the above methods, batch crystallization of the present crystalline material can be carried out under either static or agitated, e.g. stirred, conditions in a suitable reactor vessel, such as for example, polypropylene jars or teflon lined or stainless steel autoclaves. Crystallization may also be conducted continuously in suitable equipment. The total useful range of temperatures for crystallization is noted above for each method for a time sufficient for crystallization to occur at the temperature used, e.g. from about 5 minutes to about 14 days. Thereafter, the crystals are separated from the liquid and recovered.

When a source of silicon is used in the synthesis method, it is preferred to use at least in part an organic silicate, such as, for example, a quaternary ammonium silicate. Non-limiting examples of such a silicate include tetramethylammonium silicate and tetraethylorthosilicate.

By adjusting conditions of the synthesis reaction for each method, like temperature, pH and time of reaction, etc., within the above limits, embodiments of the present non-layered crystalline material with a desired average pore size may be prepared. In particular, changing the pH, the temperature or the reaction time may promote formation of product crystals with different average pore size.

Non-limiting examples of various combinations of W, X, Y and Z contemplated for the first and second synthesis methods of the present invention include:

| W | X | Y | Z |
|---|---|---|---|
| — | Al | Si | — |
| — | Al | — | P |
| — | Al | Si | P |
| Co | Al | — | P |
| Co | Al | Si | P |
| — | — | Si | — | including the combinations of W being Mg, or an element selected from the divalent first row transition metals, e.g. Mn, Co and Fe; X being B, Ga or Fe; and Y being Ge.

An organic directing agent for use in each of the above methods for synthesizing the present material from the respective reaction mixtures is an ammonium or phosphonium ion of the formula $R_1R_2R_3R_4Q^+$, i.e.:

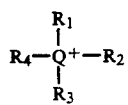

wherein Q is nitrogen or phosphorus and wherein at least one of $R_1$, $R_2$, $R_3$ and $R_4$ is aryl or alkyl of from 6 to about 36 carbon atoms, e.g. $-C_6H_{13}$, $-C_{10}H_{21}$, $-C_{16}H_{33}$ and $-C_{18}H_{37}$, or , or combinations thereof, the remainder of $R_1R_2$, $R_3$ and $R_4$ being selected from the group consisting of hydrogen, alkyl of from 1 to 5 carbon atoms and combinations thereof. The compound from which the above ammonium or phosphonium ion is derived may be, for example, the hydroxide, halide, silicate, or mixtures thereof.

In the first and third methods above it is preferred to have an additional organic directing agent and in the second method it is required to have a combination of the above organic directing agent and an additional organic directing agent. That additional organic directing agent is the ammonium or phosphonium ion of the above directing agent formula wherein $R_1$, $R_2$, $R_3$ and $R_4$ together or separately are selected from the group consisting of hydrogen and alkyl of 1 to 5 carbon atoms and combinations thereof. Any such combination of organic directing agents go to make up "R" and will be in molar ratio of about 100/1 to about 0.01/1, first above listed organic directing agent/additional organic directing agent.

The particular effectiveness of the presently required directing agent, when compared with other such agents known to direct synthesis of one or more other crystal structures, is believed due to its ability to function as a template in the above reaction mixture in the nucleation and growth of the desired ultra-large pore crystals with the limitations discussed above. Non-limiting examples of these directing agents include cetyltrimethylammonium, cetyltrimethylphosphonium, octadecyltrimethylphosphonium, benzyltrimethylammonium, cetylpyridinium, myristyltrimethylammonium, decyltrimethylammonium, dodecyltrimethylammonium and dimethyldidodecylammonium.

It should be realized that the reaction mixture components can be supplied by more than one source. The reaction mixture can be prepared either batchwise or continuously. Crystal size and crystallization time of the new crystalline material will vary with the nature of the reaction mixture employed and the crystallization conditions.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

In the examples metric units and parts by weight are employed unless otherwise indicated.

EXAMPLE 1

One hundred grams of cetyltrimethylammonium (CTMA) hydroxide solution, prepared by contacting a 29 wt. % N,N,N-trimethyl-1-hexadecanaminium chloride solution with a hydroxide-for-halide exchange resin, was combined with 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a polypropylene bottle, which was kept in a steam box at 95° C. overnight. The mixture had a composition in terms of moles per mole $Al_2O_3$:

| |
|---|
| 2.7 moles $Na_2O$ |
| 392 moles $SiO_2$ |
| 35.7 moles $(CTMA)_2O$ |
| 61.7 moles $(TMA)_2O$ |
| 6231 moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 475 $m^2/g$ and the following equilibrium adsorption capacities in grams/100 grams:

| | |
|---|---|
| $H_2O$ | 8.3 |
| Cyclohexane | 22.9 |
| n-Hexane | 18.2 |
| Benzene | 21.5 |

The product of this example may be characterized as including a very strong relative intensity line at 37.8±2.0 Angstroms d-spacing, and weak lines at 21.6±1.0 and 19.2±1.0 Angstroms. The present ultra-large pore material was demonstrated to be in the product of this example by transmission electron microscopy (TEM), which produced images of a hexagonal arrangement of uniform pores and hexagonal electron diffraction pattern with a $d_{100}$ value of about 39 Angstroms.

EXAMPLE 2

One hundred grams of cetyltrimethylammonium (CTMA) hydroxide solution prepared as in Example 1 was combined with 100 grams of an aqueous solution of tetramethylammonium (TMA) hydroxide (25%) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. overnight. The mixture had a composition in terms of moles per mole $Al_2O_3$:

| |
|---|
| 2.7 moles $Na_2O$ |
| 291 moles $SiO_2$ |
| 35.7 moles $(CTMA)_2O$ |
| 102 moles $(TMA)_2O$ |
| 6120 moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 993 $m^2/g$ and the following equilibrium adsorption capacities in grams/100 grams:

| | |
|---|---|
| $H_2O$ | 7.1 |
| Cyclohexane | 47.2 |
| n-Hexane | 36.2 |
| Benzene | 49.5 |

The X-ray diffraction pattern of the calcined product of this example is characterized as including a very strong relative intensity line at 39.3±2.0 Angstroms d-spacing, and weak lines at 22.2±1.0 and 19.4±1.0 Angstroms. TEM indicated that the product contained the present ultra-large pore material.

A portion of the above product was then contacted with 100% steam at 1450 F for two hours. The surface area of the steamed material was measured to be 440 m²/g, indicating that about 45% was retained following severe steaming.

Another portion of the calcined product of this example was contacted with 100% steam at 1250° F for two hours. The surface area of this material was measured to be 718 m²/g, indicating that 72% was retained after steaming at these conditions.

EXAMPLE 3

Water, cetyltrimethylammonium hydroxide solution prepared as in Example 1, aluminum sulfate, HiSil and an aqueous solution of tetrapropylammonium (TPA) bromide (35%) were combined to produce a mixture having a composition in terms of moles per mole $Al_2O_3$:

|  |  |
|---|---|
| 0.65 | moles $Na_2O$ |
| 65 | moles $SiO_2$ |
| 8.8 | moles $(CTMA)_2O$ |
| 1.22 | moles $(TPA)_2O$ |
| 1336 | moles $H_2O$ |

The resulting mixture was placed in a polypropylene bottle, which was kept in a steam box at 95° C. for 192 hours. The sample was then cooled to room temperature and combined with CTMA hydroxide solution prepared as in Example 1 and TMA hydroxide (25% by weight) in the weight ratio of 3 parts mixture, 1 part CTMA hydroxide and 2 parts TMA hydroxide. The combined mixture was then placed in a polypropylene bottle and kept in a steam box at 95° C. overnight. The combined mixture had a composition in terms of moles per mole $Al_2O_3$:

|  |  |
|---|---|
| 0.65 | moles $Na_2O$ |
| 65 | moles $SiO_2$ |
| 15 | moles $(CTMA)_2O$ |
| 1.22 | moles $(TPA)_2O$ |
| 35.6 | moles $(TMA)_2O$ |
| 2927 | moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 1085 m²/g and the following equilibrium adsorption capacities in grams/100 grams:

| $H_2O$ | 11.5 |
|---|---|
| Cyclohexane | >50 |
| n-Hexane | 39.8 |
| Benzene | 62 |

The X-ray diffraction pattern of the calcined product of this example is characterized as including a very strong relative intensity line at 38.2±2.0 Angstroms d-spacing, and weak lines at 22.2±1.0 and 19.4±1.0 Angstroms. TEM indicated the product contained the present ultra-large pore material.

EXAMPLE 4

Two hundred grams of cetyltrimethylammonium (CTMA) hydroxide solution prepared as in Example 1 was combined with 2 grams of Catapal alumina (alpha-alumina monohydrate, 74% alumina) and 100 grams of an aqueous solution of tetramethylammonium (TMA) silicate (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 48 hours. The mixture had a composition in terms of moles per mole $Al_2O_3$:

|  |  |
|---|---|
| 0.23 | moles $Na_2O$ |
| 33.2 | moles $SiO_2$ |
| 6.1 | moles $(CTMA)_2O$ |
| 5.2 | moles $(TMA)_2O$ |
| 780 | moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 1043 m²/g and the following equilibrium adsorption capacities in grams/100 grams:

| $H_2O$ | 6.3 |
|---|---|
| Cyclohexane | >50 |
| n-Hexane | 49.1 |
| Benzene | 66.7 |

The X-ray diffraction pattern of the calcined product of this example is characterized as including a very strong relative intensity line at 40.8±2.0 Angstroms d-spacing, and weak lines at 23.1±1.0 and 20.1±1.0 Angstroms. TEM indicated that the product contained the present ultra-large pore material (see Example 23).

EXAMPLE 5

Two-hundred sixty grams of water was combined with 77 grams of phosphoric acid (85%), 46 grams of Catapal alumina (74% alumina), and 24 grams of pyrrolidine (Pyr) with stirring. This first mixture was placed in a stirred autoclave and heated to 150° C. for six days. The material was filtered, washed and air-dried. Fifty grams of this product was slurried with 200 grams of water and 200 grams of cetyltrimethylammonium hydroxide solution prepared as in Example 1. Four hundred grams of an aqueous solution of tetraethylammonium silicate (10% silica) was then added to form a second mixture which was placed in a polypropylene bottle and kept in a steam box at 95° C. overnight. The first mixture had a composition in terms of moles per mole $Al_2O_3$:

|  |  |
|---|---|
| 1.0 | moles $P_2O_5$ |
| 0.51 | moles $(Pyr)_2O$ |
| 47.2 | moles $H_2O$ |

The resulting solid product was recovered by filtration and dried in air at ambient temperature. The product was then calcined at 540° C. for 1 hour in nitrogen, followed by 6 hours in air.

The calcined product proved to have a surface area of 707 m²/g and the following equilibrium adsorption capacities in grams/100 grams:

| | |
|---|---|
| $H_2O$ | 33.2 |
| Cyclohexane | 19.7 |
| n-Hexane | 20.1 |
| Benzene | 23.3 |

The X-ray diffraction pattern of the calcined product of this example is characterized as including a very strong relative intensity line at 25.4±1.5 Angstroms d-spacing. TEM indicated the product contained the present ultra-large pore material (see Example 23).

EXAMPLE 6

A solution of 1.35 grams of $NaAlO_2$ (43.5% $Al_2O_3$, 30% $Na_2O$) dissolved in 45.2 grams of water was mixed with 17.3 grams of NaOH, 125.3 grams of colloidal silica (40%, Ludox HS-40) and 42.6 grams of 40% aqueous solution of tetraethylammonium (TEA) hydroxide. After stirring overnight, the mixture was heated for 7 days in a steam box (95° C.). Following filtration, 151 grams of this solution was mixed with 31 grams of cetyltrimethylammonium hydroxide solution prepared as in Example 1 and stored in the steam box at 95° C. for 13 days. The mixture had the following relative molar composition:

| | |
|---|---|
| 0.25 | moles $Al_2O_3$ |
| 10 | moles $Na_2O$ |
| 36 | moles $SiO_2$ |
| 0.95 | moles $(CTMA)_2O$ |
| 2.5 | moles $(TEA)_2O$ |
| 445 | moles $H_2O$ |

The resulting solid product was recovered by filtration and washed with water and ethanol. The product was then calcined at 540° C. for 1 hour in nitrogen, followed by 6 hours in air.

The calcined product composition included 0.14 wt. % Na, 68.5 wt. % $SiO_2$ and 5.1 wt. % $Al_2O_3$, and proved to have a benzene equilibrium adsorption capacity of 58.6 grams/100 grams.

The X-ray diffraction pattern of the calcined product of this example is characterized as including a very strong relative intensity line at 31.4±1.5 Angstroms d-spacing. TEM indicated that the product contained the present ultra-large pore material.

EXAMPLE 7

A mixture of 300 grams of cetyltrimethylammonium (CTMA) hydroxide solution prepared as in Example 1 and 41 grams of colloidal silica (40%, Ludox HS-40) was heated in a 600 cc autoclave at 150° C. for 48 hours with stirring at 200 rpm. The mixture has a composition in terms of moles per mole $Si_2O$:

| | |
|---|---|
| 0.5 | mole $(CTMA)_2O$ |
| 46.5 | moles $H_2O$ |

The resulting solid product was recovered by filtration, washed with water, then calcined at 540° C. for 1 hour in nitrogen, followed by 10 hours in air.

The calcined product composition included less than 0.01 wt. % Na, about 98.7 wt. % $SiO_2$ and about 0.01 wt. % $Al_2O_3$, and proved to have a surface area of 896 m²/g. The calcined product had the following equilibrium adsorption capacities in grams/100 grams:

| | |
|---|---|
| $H_2O$ | 8.4 |
| Cyclohexane | 49.8 |
| n-Hexane | 42.3 |
| Benzene | 55.7 |

The X-ray diffraction pattern of the calcined product of this example is characterized as including a very strong relative intensity line at 40.0±2.0 Angstroms d-spacing and a weak line at 21.2±1.0 Angstroms. TEM indicated that the product of this example contained at least three separate phases, one of which was the present ultra-large pore material.

EXAMPLE 8

A mixture of 150 grams of cetyltrimethylammonium (CTMA) hydroxide solution prepared as in Example 1 and 21 grams of colloidal silica (40%, Ludox HS-40) with an initial pH of 12.64 was heated in a 300 cc autoclave at 150° C. for 48 hours with stirring at 200 rpm. The mixture had a composition in terms of moles per mole $SiO_2$:

| | |
|---|---|
| 0.5 | mole $(CTMA)_2O$ |
| 46.5 | moles $H_2O$ |

The resulting solid product was recovered by filtration, washed with water, then calcined at 540° C. for 6 hours in air.

The calcined product composition was measured to include 0.01 wt. % Na, 93.2 wt. % $SiO_2$ and 0.016 wt. % $Al_2O_3$, and proved to have a surface area of 992 m²/g and the following equilibrium adsorption capacities in grams/100 grams:

| | |
|---|---|
| $H_2O$ | 4.6 |
| Cyclohexane | >50 |
| n-Hexane | >50 |
| Benzene | 62.7 |

The X-ray diffraction pattern of the calcined product of this example is characterized as including a very strong relative intensity line at 43.6±2.0 Angstroms d-spacing and weak lines at 25.1±1.5 and 21.7±1.0 Angstroms. TEM indicated that the product contained the present ultra-large pore material.

EXAMPLE 9

Sodium aluminate (4.15 g) was added slowly into a solution containing 16 g of myristyltrimethylammonium bromide ($C_{14}$TMABr) in 100 g of water. Tetramethylammonium silicate (100 g-10% $SiO_2$), HiSil (25 g) and tetramethylammonium hydroxide (14.2 g-25% solution) were then added to the mixture. The mixture was crystallized in an autoclave at 120° C. with stirring for 24 hours.

The product was filtered, washed and air dried. Elemental analysis showed the product contained 53.3 wt % SiO$_2$, 3.2 wt % Al$_2$O$_3$, 15.0 wt % C, 1.88 wt % N, 0.11 wt % Na and 53.5 wt % ash at 1000° C. The X-ray diffraction pattern of the material (calcined at 540° C. for 1 hour in N$_2$ and 6 hours in air) includes a very strong relative intensity line at 35.3±2.0 Angstroms d-spacing and weak lines at 20.4±1.0 and 17.7±1.0 Angstroms d-spacing. TEM indicated that the product contained the present ultra-large pore material.

The washed product, having been exchanged with 1N ammonium nitrate solution at room temperature, then calcined, proved to have a surface area of 827 m$^2$/g and the following equilibrium adsorption capacities in g/100 g anhydrous sorbent:

| | |
|---|---|
| H$_2$O | 30.8 |
| Cyclohexane | 33.0 |
| n-Hexane | 27.9 |
| Benzene | 40.7 |

EXAMPLE 10

Sodium aluminum (4.15 g) was added slowly into a solution containing 480 g of dodecyltrimethylammonium hydroxide (C$_{12}$TMAOH, 50%) solution diluted with 120 g of water. UltraSil (50 g) and an aqueous solution of tetramethylammonium silicate (200 g-10% SiO$_2$) and tetramethylammonium hydroxide (26.38 g-25% solution) were then added to the mixture. The mixture was crystallized in an autoclave at 100° C. with stirring for 24 hours.

The product was filtered, washed and air dried. The X-ray diffraction pattern of the material (calcined at 540° C. for 1 hour in N$_2$ and 6 hours in air) includes a very strong relative intensity line at 30.4±1.5 Angstroms d-spacing and weak lines at 17.7±1.0 and 15.3±1.0 Angstroms d-spacing. TEM indicated that the product contained the present ultra-large pore material.

The washed product, having been exchanged with 1N ammonium nitrate solution at room temperature, then calcined, proved to have a surface area of 1078 m$^2$/g and the following equilibrium adsorption capacities in g/100 g anhydrous sorbent:

| | |
|---|---|
| H$_2$O | 32.6 |
| Cyclohexane | 38.1 |
| n-Hexane | 33.3 |
| Benzene | 42.9 |

EXAMPLE 11

A solution of 4.9 grams of NaAlO$_2$ (43.5 % Al$_2$O$_3$, 30% NaO$_2$) in 37.5 grams of water was mixed with 46.3 cc of 40% aqueous tetraethylammonium hydroxide solution and 96 grams of colloidal silica (40%, Ludox HS-40). The gel was stirred vigorously for 0.5 hour, mixed with an equal volume (150 ml) of cetyltrimethylammonium hydroxide solution prepared as in Example 1 and reacted at 100° C. for 168 hours. The mixture had the following composition in terms of moles per mole Al$_2$O$_3$:

| | |
|---|---|
| 1.1 | moles Na$_2$O |
| 30.6 | moles SiO$_2$ |
| 3.0 | moles (TEA)$_2$O |
| 3.25 | moles (CTMA)$_2$O |
| 609 | moles H$_2$O |

The resulting solid product was recovered by filtration, washed with water then calcined at 540° C. for 16 hours in air.

The calcined product proved to have a surface area of 1352 m$^2$/g and the following equilibrium adsorption capacities in grams/100 grams:

| | |
|---|---|
| H$_2$O | 23.6 |
| Cyclohexane | >50 |
| n-Hexane | 49 |
| Benzene | 67.5 |

The X-ray diffraction pattern of the calcined product of this example may be characterized as including a very strong relative intensity line at 38.5±2.0 Angstrom weak line at 20.3±1.0 Angstroms. TEM indicated that the product contained the present ultra-large pore material.

EXAMPLE 12

Two hundred grams of cetyltrimethylammonium (CTMA) hydroxide solution prepared as in Example 1 was combined with 4.15 grams of sodium aluminate and 100 grams of aqueous tetramethylammonium (TMA) silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a static autoclave at 150° C. for 24 hours. The mixture had a composition in terms of moles per mole Al$_2$O$_3$:

| | |
|---|---|
| 1.25 | moles Na$_2$O |
| 27.8 | moles SiO$_2$ |
| 5.1 | moles (CTMA)$_2$O |
| 4.40 | moles (TMA)$_2$O |
| 650 | moles H$_2$O |

The resulting solid product was recovered by filtration and dried in air at ambient temperature. The product was then calcined at 540° C. for 1 hour in nitrogen, followed by 6 hours in air. TEM indicated that this product contained the present ultra-large pore material. The X-ray diffraction pattern of the calcined product of this example can be characterized as including a very strong relative intensity line at 44.2±2.0 Angstroms d-spacing and weak lines at 25.2±1.5 and 22.0±1.0 Angstroms.

The calcined product proved to have a surface area of 932 m$^2$/g and the following equilibrium adsorption capacities in grams/100 grams:

| | |
|---|---|
| H$_2$O | 39.3 |
| Cyclohexane | 46.6 |
| n-Hexane | 37.5 |
| Benzene | 50 |

The product of this example was then ammonium exchanged with 1 N NH$_4$NO$_3$ solution, followed by calcination at 540° C. for 10 hours in air.

EXAMPLE 13

Two hundred grams of cetyltrimethylammonium (CTMA) hydroxide solution prepared as in Example 1 was combined with 4.15 grams of sodium aluminate and 100 grams of aqueous tetramethylammonium (TMA)

silicate solution (10% silica) with stirring. Twenty-five grams of HiSil, a precipitated hydrated silica containing about 6 wt. % free water and about 4.5 wt. % bound water of hydration and having an ultimate particle size of about 0.02 micron, was added. The resulting mixture was placed in a steam box at 100° C. for 48 hours. The mixture had a composition in terms of moles per mole $Al_2O_3$:

| | |
|---|---|
| 1.25 moles | $Na_2O$ |
| 27.8 moles | $SiO_2$ |
| 5.1 moles | $(CTMA)_2O$ |
| 4.4 moles | $(TMA)_2O$ |
| 650 moles | $H_2O$ |

The resulting solid product was recovered by filtration and dried in air at ambient temperature. The product was then calcined at 540° C. for 1 hour in nitrogen, followed by 6 hours in the air.

The calcined product proved to have the following equilibrium adsorption capacities in grams/100 grams:

| | |
|---|---|
| $H_2O$ | 35.2 |
| Cyclohexane | >50 |
| n-Hexane | 40.8 |
| Benzene | 53.5 |

The X-ray diffraction pattern of the calcined product of this example may be characterized as including a very strong relative intensity line at 39.1±2.0 Angstroms d-spacing and weak lines at 22.4±1.0 and 19.4±1.0 Angstroms. TEM indicated that this product contained the present ultra-large pore material.

The product of this example was then ammonium exchanged with 1 N $NH_4NO_3$ solution, followed by calcination at 540° C. for 10 hours in air.

EXAMPLE 14

A mixture of 125 grams of 29% CTMA chloride aqueous solution, 200 grams of water, 3 grams of sodium aluminate (in 50 grams $H_2O$), 65 grams of Ultrasil, amorphous precipitated silica available from PQ Corporation, and 21 grams NaOH (in 50 grams $H_2O$) was stirred thoroughly and crystallized at 150° C. for 168 hours. The reaction mixture had the following relative molar composition in terms of moles per mole silica:

| | |
|---|---|
| 0.10 moles | $(CTMA)_2O$ |
| 21.89 moles | $H_2O$ |
| 0.036 moles | $NaAlO_2$ |
| 0.53 moles | NaOH |

The solid product was isolated by filtration, washed with water, dried for 16 hours at room temperature and calcined at 540° C. for 10 hours in air.

The calcined product proved to have a surface area of 840 $m^2/g$, and the following equilibrium adsorption capacities in grams/100 grams:

| | |
|---|---|
| $H_2O$ | 15.2 |
| Cyclohexane | 42.0 |
| n-Hexane | 26.5 |
| Benzene | 62 |

The X-ray diffraction pattern of the calcined product of this Example may be characterized as including a very strong relative intensity line at 40.5±2.0 Angstroms d-spacing. TEM indicated that the product contained the present ultra-large pore material.

EXAMPLE 15

For comparison purposes, a commercially prepared ultra-stable zeolite Y was obtained. It had a benzene equilibrium adsorption capacity of 20.7 grams/100 grams. Its X-ray diffraction pattern had all the lines of zeolite Y with its highest value peak at about 14.0 Angstroms d-spacing.

EXAMPLE 16

To make the primary template mixture for this example, 240 grams of water was added to a 92 gram solution of 50% dodecyltrimethylammonium hydroxide, 36% isopropyl alcohol and 14% water such that the mole ratio of Solvent/$R_{2/f}O$ was 155. The mole ratio of $H_2O$/$R_{2/f}O$ in this mixture was 149 and the IPA/$R_{2/f}O$ mole ratio was 6. To the primary template mixture was added 4.15 grams of sodium aluminate, 25 grams of HiSil, 100 grams of aqueous tetramethylammonium silicate solution (10% $SiO_2$) and 13.2 grams of 25% aqueous tetramethylammonium hydroxide solution The mole ratio of $R_{2/f}O/(SiO_2+Al_2O_3)$ was 0.28 for the mixture.

This mixture was stirred at 25° C. for 1 hour. The resulting mixture was then placed in an autoclave at 100° C. and stirred at 100 rpm for 24 hours. The mixture in the autoclave had the following relative molar composition in terms of moles per mole $SiO_2$:

| | |
|---|---|
| 0.05 mole | $Na_2O$ |
| 0.036 mole | $Al_2O_3$ |
| 0.18 mole | $(C_{12}TMA)_2O$ |
| 0.12 mole | $(TMA)_2O$ |
| 36.0 moles | $H_2O$ |
| 1.0 mole | IPA |

The resulting solid product was recovered by filtration, washed with water and dried in air at ambient temperature. The product was then calcined at 540° C. for 1 hour in nitrogen, followed by 6 hours in air.

The calcined product proved to have a surface area of 1223 $m^2/g$ and the following equilibrium adsorption capacities in grams/100 grams:

| | |
|---|---|
| $H_2O$ | 25.5 |
| Cyclohexane | 41.1 |
| n-Hexane | 35.1 |
| Benzene | 51 |

The X-ray diffraction pattern of the calcined product of is characterized as including a very strong relative intensity line at 30.8±1.5 Angstroms d-spacing and weak lines at 17.9±1.0 and 15.5±1.0 Angstroms. TEM indicated this product to contain the present ultra-large pore material.

EXAMPLE 17

A 50.75 gram quantity of decyltrimethylammonium hydroxide (prepared by contacting a ca. 29 wt. % solution of decyltrimethylammonium bromide with a hydroxide-for-halide exchange resin) was combined with 8.75 grams of tetraethylorthosilicate. The mixture was stirred for about 1 hour and then transferred to a polypropylene jar which was then placed in a steambox for about 24 hours. The mixture had a composition in terms of moles per mole $SiO_2$:

```
0.81 mole $(C_{10}TMA)_2O$
47.6 moles $H_2O$
```

The resulting solid product was filtered and washed several times with warm (60°–70° C.) distilled water and with acetone. The final product was calcined to 538° C. in $N_2$/air mixture and then held in air for about 8 hours.

The calcined product proved to have a surface area of 915 m²/g and an equilibrium benzene adsorption capacity of 35 grams/100 grams. Argon physisorption data indicated an argon uptake of 0.34 cc/gram, and a pore size of 15 Angstroms.

The X-ray diffraction pattern of the calcined product of this example may be characterized as including a very strong relative intensity line at 27.5±1.5 Angstroms d-spacing and weak lines at 15.8±1.0 and 13.7±1.0 Angstroms. TEM indicated that the product of this example contained the present ultra-large pore material.

EXAMPLE 18

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 70 grams of 1,3,5-trimethylbenzene (mesitylene). The resulting mixture was stirred at room temperature for several minutes. The gel was then loaded into a 600 cc autoclave and heated at 105° C. for sixty-eight hours with stirring at 150 rpm. The mixture had a composition in terms of moles per mole $Al_2O_3$:

```
1.25  moles $Na_2O$
27.8  moles $SiO_2$
5.1   moles $(CTMA)_2O$
2.24  moles $(TMA)_2O$
2256  moles $H_2O$
80.53 moles 1,3,5-trimethylbenzene
```

The resulting product was filtered and washed several times with warm (60°–70° C.) distilled water and with acetone. The final product was calcined to 538° C. in $N_2$/air mixture and then held in air for about 10 hours.

The calcined product proved to have an equilbrium benzene adsorption capacity of >25 grams/100 grams.

The X-ray diffraction pattern of the calcined product of this example may be characterized as including a broad, very strong relative intensity line at about 102 Angstroms d-spacing, but accurate positions of lines in the extreme low angle region of the X-ray diffraction pattern are very difficult to determine with conventional X-ray diffractometers. Furthermore, finer collimating slits were required to resolve a peak at this low 2-theta angle. The slits used in this example, starting at the X-ray tube, were 0.1, 0.3, 0.5 and 0.2 mm, respectively. TEM indicated that the product of this example contained several materials with different $d_{100}$ values as observed in their electron diffraction patterns. These materials were found to possess $d_{100}$ values between about 85 Angstroms d-spacing and about 120 Angstroms d-spacing.

EXAMPLE 19

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, 200 grams of water and 120 grams of 1,3,5-trimethylbenzene (mesitylene). The resulting mixture was stirred at room temperature for several minutes. The gel was then loaded into a 600 cc autoclave and heated at 105° C. for ninety hours with stirring at 150 rpm. The mixture had a composition in terms of moles per mole $Al_2O_3$:

```
1.25   moles $Na_2O$
27.8   moles $SiO_2$
5.1    moles $(CTMA)_2O$
2.24   moles $(TMA)_2O$
2256   moles $H_2O$
132.7  moles 1,3,5-trimethylbenzene
```

The resulting product was filtered and washed several times with warm (60°–70° C.) distilled water and with acetone. The final product was calcined to 538° C. in $N_2$/air mixture and then held in air for about 10 hours.

The calcined product proved to have a surface area of 915 m²/g and an equilbrium benzene adsorption capacity of >25 grams/100 grams. Argon physisorption data indicated an argon uptake of 0.95 cc/gram, and a pore size centered on 78 Angstroms (Dollimore-Heal Method, see Example 22(b)), but running from 70 to greater than 105 Angstoms.

The X-ray diffraction pattern of the calcined product of this example may be characterized as having only enhanced scattered intensity in the very low angle region of the X-ray diffraction, where intensity from the transmitted incident X-ray beam is usually observed. However, TEM indicated that the product of this example contained several materials with different $d_{100}$ values as observed in their electron diffraction patterns. These materials were found to possess $d_{100}$ values between about 85 Angstroms d-spacing and about 110 Angstroms d-spacing.

EXAMPLE 20

To eighty grams of cetyltrimethylammonium hydroxide (CTMAOH) solution prepared as in Example 1 was added 1.65 grams of $NaAlO_2$. The mixture was stirred at room temperature until the $NaAlO_2$ was dissolved. To this solution was added 40 grams of aqueous tetramethylammonium (TMA) silicate solution (10 wt. % $SiO_2$), 10 grams of HiSil, and 18 grams of 1,3,5-trimethylbenzene (mesitylene). The resulting mixture was stirred at room temperature for several minutes. The gel was then loaded into a 300 cc autoclave and heated at 105° C. for four hours with stirring at 150 rpm. The mixture had a composition in terms of moles per mole $Al_2O_3$:

```
1.25  moles $Na_2O$
27.8  moles $SiO_2$
5.1   moles $(CTMA)_2O$
```

-continued 2.24 moles (TMA)₂O
    650 moles H₂O
    19.9 moles 1,3,5-trimethylbenzene The resulting product was filtered and washed several times with warm (60°-70° C.) distilled water and with acetone. The final product was calcined to 538° C. in N₂/air mixture and then held in air for about 8 hours.

The calcined product proved to have a surface area of 975 m²/g and an equilbrium benzene adsorption capacity of >40 grams/100 grams. Argon physisorption data indicated an argon uptake of 0.97 cc/gram, and a pore size of 63 Angstroms (Dollimore-Heal Method, see Example 22(b)), with the peak occurring at $P/P_o=0.65$.

The X-ray diffraction pattern of the calcined product of this example may be characterized as including a very strong relative intensity line at 63±5 Angstroms d-spacing and weak lines at 36.4±2.0, 31.3±1.5 Angstroms and 23.8±1.0 Angstroms d-spacing. TEM indicated that the product of this example contained the present ultra-large pore material.

EXAMPLE 21

For catalytic evaluation of the present invention, final products from Examples 1 through 15 were evaluated for dealkylation of tri-tert-butylbenzene (TBB) to di-tert butylbenzene. The present evaluation was conducted under one or both of two sets of conditions: (i) at a temperature of 225° C., weight hourly space velocity of 100 hr⁻¹ or (ii) at a temperature of 200° C., weight hourly space velocity of 200 hr⁻¹. Pressure was atmospheric. The feed was composed of 6.3/93.7 TTBB/toluene. Conversion was measured at 30 minutes on stream.

The results were as follows:

| Catalyst of | Conversion, wt. % | |
| --- | --- | --- |
| Example | 225° C./100 hr⁻¹ | 200° C./200 hr⁻¹ |
| 1 | 0 | — |
| 2 | 6.2 | — |
| 3 | 53.9 | — |
| 4 | 10.4 | — |
| 5 | 68.9 | — |
| 6 | 100.0 | — |
| 7 | 93.4 | 66.0 |
| 8 | 5.3 | — |
| 9 | — | 61.2 |
| 10 | — | 58.9 |
| 11 | 86.3 | — |
| 12 | 96.7 | — |
| 13 | 92.8 | — |
| 14 | — | 37.7 |
| 15 | 12.0 | 0 |

EXAMPLE 22(a)

Argon Physisorption For Pore Systems Up to About 60 Angstroms Diameter

To determine the pore diameters of the products of this invention with pores up to about 60 Angstroms in diameter, 0.2 gram samples of the products of Examples 1 through 17 were placed in glass sample tubes and attached to a physisorption apparatus as described in U.S. Pat. No. 4,762,010, which is incorporated herein by reference.

The samples were heated to 300° C. for 3 hours in vacuo to remove adsorbed water. Thereafter, the samples were cooled to 87° K. by immersion of the sample tubes in liquid argon. Metered amounts of gaseous argon were then admitted to the samples in stepwise manner as described in U.S. Pat. No. 4,762,010, column 20. From the amount of argon admitted to the samples and the amount of argon left in the gas space above the samples, the amount of argon adsorbed can be calculated. For this calculation, the ideal gas law and the calibrated sample volumes were used. (See also S. J. Gregg et al., Adsorption, Surface Area and Porosity, 2nd ed., Academic Press, 1982). It is common to use relative pressures which are obtained by forming the ratio of the equilibrium pressure and the vapor pressure $P_o$ of the adsorbate at the temperature where the isotherm is measured. Sufficiently small amounts of argon were admitted in each step to generate 168 data points in the relative pressure range from 0 to 0.6. At least about 100 points are required to define the isotherm with sufficient detail.

The step (inflection) in the isotherm, in this case (Example 4 product) at about $P/P_o=0.4$, indicates filling of a pore system. The size of the step indicates the amount adsorbed, whereas the position of the step in terms of $P/P_o$ reflects the size of the pores in which the adsorption takes place. Larger pores are filled at higher $P/P_o$. In order to better locate the position of the step in the isotherm, the derivative with respect to log $(P/P_o)$ is formed. There is further provided a physical scale on the axis which converts the position of an adsorption peak in terms of log $(P/P_o)$ to the physical pore diameter in Angstroms. This conversion was obtained by using the following formula:

$$\log(P/P_o) = \frac{K}{d - 0.38} \left[ \frac{S^4}{3(L - D/2)^3} - \frac{S^{10}}{9(L - D/2)^9} - \frac{S^4}{3(D/2)^3} + \frac{S^{10}}{9(D/2)^9} \right]$$

wherein d=pore diameter in nanometers, K=32.17, S=0.2446, L=d+0.19, and D=0.57.

This formula is derived from the method of Horvath and Kawazoe (G. Horvath et al., J. Chem. Eng. Japan, 16 (6) 470(1983)). The constants required for the implementation of this formula were determined from a measured isotherm of ALPO-5 and its known pore size. This method is particularly useful for microporous materials having pores of up to about 60 Angstroms in diameter.

The pore size of the material of Example 4 is 39.6 Angstroms with the peak occurring at log $(P/P_o)=-0.4$ or $P/P_o=0.4$, while the pore size of the material from U.S. Patent 4,880,611 is 12 Angstroms or $P/P_o=0.02$. In the other materials, a peak is observed at $P/P_o=0.015$. This peak reflects adsorption on the walls of the pores and is not otherwise indicative of the size of the pores of a given material. A value of $P/P_o$ of 0.03 corresponds to 13 Angstroms pore size.

The results of this procedure for the samples from Examples 1 through 17 are tabulated below. The samples from Examples 10, 13 and 16 gave two separate peaks, believed to be the result of two separate ultra-large pore phases in the products.

| Examples | Pore Diameter, Angstroms |
| --- | --- |
| 1 | 32.2 |

-continued

| Examples | Pore Diameter, Angstroms |
|---|---|
| 2 | 35.4 |
| 3 | 42.5 |
| 4 | 39.6 |
| 5 | 16.9 |
| 6 | 27.3 |

Process Description

Typical naphtha feedstock materials for selective cracking are produced in petroleum refineries by distillation of crude oil. Typical straight run naphtha fresh feedstock usually contains at least 15 wt % (preferably about 20 to 50 wt %) C7–C12 normal and branched alkanes, at least 15 wt % (preferably about 20 to 50%) C6+cycloaliphatic (i.e., naphthene) hydrocarbons, and 1 to 40% (preferrably less than 20%) aromatics. The C6–C12 hydrocarbons have a normal boiling range of about 60 to 175° C.. In addition to virgin naphtha, the process can utilize various paraffin containing feedstocks, such as derived from hydrocracking, cracked FCC naphtha, hydrocracked naphtha, coker naphtha, visbreaker naphtha and reformer extraction (Udex) raffinate, including mixtures thereof. Other suitable feedstock materials are disclosed by Q.Le et al in U.S. Pat. No. 4,969,987 (Docket 5603), incorporated by Reference. For purposes of explaining the invention, discussion is directed mainly to virgin naphtha and methanol feedstock materials.

General Cracking Process Conditions: The selective cracking conditions include total pressure up to about 500 kPa and reaction temperature of about 425 to 650° C., preferrably at pressure less than 175 kPa and temperature in the range of about 450 to 540° C., wherein the cracking reaction produces more than 10 wt % branched C4–C5 aliphatics, and less than 10% C2- light aliphatic gas, based on fresh naphtha feedstock.

The cracking reaction severity is maintained by employing a weight hourly space velocity of about 1 to 50 (preferably about 1–10 WHSV based on active catalyst solids) and contact time less than 10 seconds, usually about 1–2 sec. While fixed bed, moving bed or dense fluidized bed catalyst reactor systems may be adapted for the cracking step, it is preferred to use a vertical riser reactor with fine catalyst particles being circulated in a fast fluidized bed. Reaction conditions for this process are similar to those described in U.S. Patent Application Ser. No. 07/607,932 (Q.Le et al/Docket 5964S), now U.S. Pat. No. 5,100,533.

Acid of the catalyst can vary substantially. The Bronsted acid sites may be partially inactivated to provide the desired degree of acidity, which may be expressed as acid cracking activity (alpha value), preferrably less than 15.

Etherificaton Operation: The reaction of methanol with isobutylene and isoamylenes at moderate conditions with a resin catalyst is known technology, as provided by R. W. Reynolds, et al., *The Oil and Gas Journal*, Jun. 16, 1975, and S. Pecci and T. Floris, *Hydrocarbon Processing*, December 1977. An article entitled "MTBE and TAME - A Good Octane Boosting Combo", by J. D. Chase, et al., *The Oil and Gas Journal*, Apr. 9, 1979, pages 149–152, discusses the technology. A preferred catalyst is a sulfonic acid ion exchange resin which etherifies the reactants. A typical acid catalyst is Amberlyst 15 sulfonic acid resin.

Processes for producing and recovering MTBE and other methyl tert-alkyl ethers for $C_4$–$C_7$ iso-olefins are known to those skilled in the art, such as disclosed in U.S. Pat. No. 4,788,365 (Owen et al), incorporated by reference. Various suitable extraction and distillation techniques are known for recovering ether and hydrocarbon streams from etherification effluent; however, it is advantageous to convert unreacted methanol and other volatile components of etherificaton effluent by zeolite catalysis.

PROCESS EXAMPLE A

Petroleum naphtha is partially cracked by contact with MCM-41 catalyst prepared according to the method of Example 13, a hexagonal crystalline aluminosilicate having pores of 35 and 42.1 Anstroms. The ultra large pore catalyst employed in the following examples is an alumina-bound MCM-41 catalyst prepared by pelletizing 65 wt % H-MCM-41 prepared by the method of Example 13 and calcined with 35 wt % $Al_2O_3$ binder to provide (14/24 mesh) particles. Standard H-ZSM-5/$Al_2O_3$, an extruded catalyst containing 65 wt % zeolite, is also evaluated for comparison. Experimental runs are performed to demonstrate naphtha cracking in a fixed-bed isothermal tubular reactor, at weight hourly space velocity of 6/hr. catalyst were heated to about 540° C. (1000.F) under nitrogen and maintained at this temperature and 445 KpA pressure (50 psig) for 18 hours. To commence the reaction, an Arab Light $C_6$–350° F. straight run naphtha was charged to the reactor at a rate of 6 WHSV. The composition of the naphtha feedstock is:

| | |
|---|---|
| Total $C_5$- | 1.5 wt % |
| Normal Paraffins $C_6$-$C_{11}$ | 26.3 wt % |
| Isoparaffins $C_6$-$C_{11}$ | 31.3 wt % |
| Naphthenes $C_6$-$C_{11}$ | 25.7 wt % |
| Aromatics $C_6$-$C_{11}$ | 14.3 wt % |
| Total $C_{12}+$ | 0.9 wt % |

Nitrogen flow rate is regulated to maintain contact time of approximately one second. Liquid is fed continuously to the reactor for 30 minutes, followed by 30 minutes of nitrogen purging before resumption of the feed. Conversion values are based on the amount of $C_5$-products produced for less than 50% partial conversion of feedstock.

TABLE A

Cracking of Naphtha (C6-350° C.) over Various Catalysts 1000° F., 50 psig, 2 Hours on Stream

| | MCM-41 | ZSM-5 |
|---|---|---|
| Conversion, wt. % | 45 | 43 |
| Selectivity, wt. % | | |
| $C_1$-$C_2$ par. | 5 | 6 |
| $C^=_2$ | 4 | 11 |
| $C_3^=$-$C_5^=$(total) | 74 | 54 |
| $nC_3$-$nC_5$ | 6 | 23 |
| $iC_4$-$iC_5$ | 11 | 6 |

The results from naphtha cracking studies, displayed in Table A, show that the MCM-41 exhibits higher selectivity for $C_3$-$C_5$ olefins than medium-pore ZSM-5 at comparable conditions. The total yield of undesirable products (light gas+linear paraffins) is much higher from ZSM-5 than MCM-41.

The olefinic $C_5$- product of Example A is etherified by reaction with methanol over acid catalyst to product MTBE and TAME octane improvers. Isobutane and isopentanes from cracking effluent may be recovered from the primary stage effluent or passed through the etherification unit operation unreacted. These C4–C5 isoalkanes can be upgraded to high octane fuel components by conventional alkylation with propene or butene. Alternatively, the isoalkanes can be dehydrogenated to the corresponding isoalkenes and etherified with primary isoalkene products to make tertiary alkyl ethers.

MCM-41 cracking catalysis is characterized by low yields of undesirable normal C3–C5 alkanes and substantially increased yields of isobutane and isopentanes, which can be further upgraded to high octane fuel components by conventional HF alkylation or dehydrogenated to the corresponding isoalkene.

These data show that significant conversion of the paraffins and naphthenes at these conditions do occur to produce iso-alkenes in good yield, with improved yield of isobutane and isopentanes and increased yield of total C4–C5 branched paraffins. The other products include small amounts of straight chain n-C3–C5 olefins and C1–C2 aliphatics. Yield of total C5- olefin is increased slightly. The reaction rate is stable over a long stream time under continuous process conditions.

Fluidized bed configuration is preferred for the short contact time cracking step, particularly at high temperature (800°–1200° F.) and short-contact time (<10 sec) conditions. Moving-bed and fixed-bed reactors are also viable for high activity and stable catalysts which might not require frequent regeneration. Preferred process conditions for fixed and moving -bed configuration would be in low reactor temperature (500°–800° F.), space velocities (1–10 WHSV) and in the substantial absense of added hydrogen. The use of ultra large pore catalysts for the cracking of naphtha can also be applied in many other reactor configurations (e.g., dense fluid-bed reactor, moving-bed reactor, fixed-bed reactor with recycle, etc.).

In a multistage process for upgrading paraffinic naphtha to high octane fuel, the primary cracking stage comprises contacting a fresh paraffinic petroleum naphtha feedstock stream (e.g.- having a normal boiling range of about 65° to 175° C.) for about 0.5 to 10 seconds with a first fluidized bed of mesoporous acid cracking catalyst comprising MCM-41 under low pressure selective cracking conditions effective to produce at least 5 wt % total C4–C5 branched aliphatic hydrocarbons containing isobutene, isoamylenes, isobutane and isopentanes, followed by separating cracking effluent to obtain a light olefinic fraction rich in C4–C5 tertiary alkenes. The tertiary olefins from the C4–C5 isoalkene fraction may be etherified by catalytic reaction with lower alkanol to produce tertiary-alkyl ether product. It is advantegeous to recover isobutane and isopentanes from cracking effluent and further convert the isobutane and isopentane to high octane fuel components, as by alkylation with non-tertiary olefins.

Another process variation contemplates optimizing zeolite isomerization of C4- ether reaction effluent components to produce additional isobutene and isoamylenes for recycle and/or lighter olefins for further upgrading by zeolite catalysts.

Naphtha cracking provides an attractive route for the production of light olefins and isoparaffins. These hydrocarbons can be used as feedstocks for the production of high-octane "clean fuels" such as ethers and alkylates. The MCM-41 mesoporous catalyst of the present invention displays excellent selectivity for C5- olefins and isoparaffins during the cracking of naphtha. Process technology utilizing this catalyst may provide a cost-effective alternative to naphtha reforming for the production of high-octane gasoline, particularly if limitations are placed on the aromatic content of gasoline.

Various modifications can be made to the system, especially in the choice of equipment and non-critical processing steps. While the invention has been described by specific examples, there is no intent to limit the inventive concept as set forth in the following claims.

We claim:

1. A process for cracking paraffinic naphtha feedstock by contacting the feedstock with acid porous solid catalyst at elevated temperature under acid cracking conditions and low pressure, selective, partial cracking conditions effective to produce enhanced selectivity of at least 10 wt % C4–C5 isoalkene; said catalyst comprising an inorganic, porous crystalline phase material having, after calcination, a hexagonal arrangement of uniformly-sized pores having diameters of at least 13 Angstrom Units and exhibiting a hexagonal electron diffraction pattern that can be indexed with a $d_{100}$ value greater than 18 Angstrom Units.

2. The process of claim 1 wherein said crystalline phase has an X-ray diffraction pattern following calcination with at least one peak whose d-spacing corresponds to the $d_{100}$ value from the electron diffraction pattern.

3. The process of claim 1 wherein said crystalline phase exhibits a benzene adsorption capacity of greater than 15 grams benzene per 100 grams of said crystalline phase material at 50 torr and 25° C.

4. The process of claim 1 wherein said crystalline phase has a composition expressed as follows:

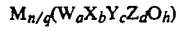

$$M_{n/q}(W_aX_bY_cZ_dO_h)$$

wherein M is one or more ions; n is the charge of the composition excluding M expressed as oxides; q is the weighted molar average valence of M; n/q is the number of moles or mole fraction of M; W is one or more divalent elements; X is one or more trivalent elements; Y is one or more tetravalent elements; Z is one or more pentavalent elements; a, b, c, and d are mole fractions of W, X, Y, and Z, respectively; h is a number of from 1 to 2.5; and $(a+b+c+d)=1$.

5. The process of claim 4 wherein the sum $(a+b+c)$ is greater than d, and $h=2$.

6. The process of claim 4 wherein W is selected from a divalent first row transition metal or magnesium; X is selected from aluminum, boron, gallium or iron; Y is selected form silicon or germanium; and Z comprises phosphorus.

7. The process of claim 4 wherein W comprises cobalt, X comprises aluminum, Y comprises silicon and Z comprises phosphorus.

8. The process of claim 5 wherein W is selected from a divalent first row transition metal or magnesium; X is selected from aluminum, boron, gallium or iron; Y is selected from silicon or germanium; and Z comprises phosphorus.

9. The process of claim 5 wherein W comprises cobalt, X comprises aluminum, comprises silicon and Z comprises phosphorus.

10. The process of claim 4 wherein a and d are 0 and $h=2$.

11. The process of claim 10 wherein X is selected from aluminum, boron, gallium or iron and Y is selected from silicon or germanium.

12. The process of claim 10 herein X comprises aluminum and Y comprises silicon.

13. The process of claim 12 wherein said ions comprise hydrogen or a hydrogen precursor.

14. The process of claim 1 wherein said catalyst comprises a matrix binder.

15. A process for catalytic cracking of naphtha range hydrocarbon feedstock which comprises contacting said feedstock for less than 10 seconds under low pressure partial cracking conditions effective for cracking less than 50 wt % of feedstock hydrocarbons and to produce at least 20 wt % selectivity to isomeric C4–C5 aliphatics containing C4–C5 tertiary alkene and at least 10 wt % C4–C5 isoalkane with acid metallosilicate solid catalyst having the structure of MCM-14 with hexagonal honeycomb lattice structure consisting essentially of uniform pores in the range of 20 to 100 Angstroms to produce branched C4–C5 hydrocarbons.

16. The process of claim 15 wherein said metallosilicate comprises tetrahedrally coordinated metal selected from Al or Ga atoms; wherein reaction temperature is 425°–650° C.; pressure is up to 500 kPa; contact time is at least 0.5 seconds and weight hourly space velocity, based on active catalyst, is 1–50/hr.

17. The process of claim 16 wherein the catalyst consists essentially of MCM-41, wherein the reaction temperature is about 500°–650° C.

18. A process for upgrading paraffinic naphtha to high octane fuel comprising:
contacting a fresh naphtha feedstock stream containing a major amount of C7+ paraffins with mesoporous acid MCM-41 cracking catalyst under low pressure selective cracking conditions effective to produce at least 20 wt % selectivity to isomeric C4–C5 aliphatics containing C4–C5 isoalkene and at least 10 wt % C4–C5 isoalkane, said cracking catalyst being substantially free of hydrogenation-dehydrogenation metal components and having an acid cracking activity less than 15;
separating cracking effluent to obtain an olefinic fraction rich in C4–C5 isoalkene and a C6+ fraction;
etherifying the olefinic C4–C5 fraction by catalytic reaction with lower alkanol to produce tertiary-alkyl ether product; and
converting residual C4–C5 isoalkane to provide high octane fuel components.

19. A process for upgrading paraffinic naphtha to high octane fuel according to claim 18, wherein the fresh feedstock contains at least 20 wt % C7–C12 alkanes and less than 40% aromatics; the cracking conditions include total pressure up to about 500 kPa, space velocity greater than 1/hr WHSV, and reaction temperature of about 425 to 650° C.

20. A process for upgrading naphtha comprising predominantly alkanes and/or naphthenes according to claim 19 wherein the cracking catalyst consists essentially of aluminosilicate MCM-41; the cracking reaction is maintained at about 450° to 540° C.; the contact time is 1–2 seconds and weight hourly space velocity of 1–10/hr; and wherein the fresh feedstock consists essentially of C7+ paraffinic virgin petroleum naphtha boiling in the range of about 65° to 175° C.

21. A process for upgrading paraffinic naphtha to high octane fuel by contacting a fresh virgin naphtha feedstock stream containing predominantly C7–C12 paraffins with acid MCM-41 cracking catalyst under low pressure, short contact time, selective, partial cracking conditions at pressure less than 175 kPa, reaction temperature of 425° to 650° C. and effective to produce at least 10 wt % selectivity to C4–C5 isoalkene.

22. A process for upgrading paraffinic naphtha to high octane fuel according to claim 21 wherein the fresh feedstock contains less than 20% aromatics; the cracking conditions include total pressure up to 450° to kPa and reaction temperature of 450° to 540° C. under less than 50 wt % partial feedstock conversion conditions.

23. The process of claim 21 wherein fluidized bed catalyst is contacted with the feedstock in a vertical riser reactor during a short contact period of 0.5 to 10 seconds sufficient to produce said at least 10 wt % C4–C5 isoalkene in a transport regime wherein said catalyst is separated from said isoalkene and is recycled to said upgrading step; wherein said cracking reaction is carried out in the substantial absence of added hydrogen; and wherein the space velocity is 1 to 10, based on active catalyst solids.

24. A process for catalytic cracking of naphtha feedstock which comprises contacting feedstock containing at least 20 wt % C7–C12 alkanes under catalytic reaction conditions with inorganic, porous, non-layered crystalline phase catalyst material exhibiting, after calcination, an X-ray diffraction pattern with at least one peak at a d-spacing greater than 18 Angstrom units and having a benzene adsorption capacity greater than 15 grams of benzene per 100 grams of said material at 50 torr and 25° C. said catalyst material having active Bronsted acid sites; and wherein said cracking conditions include total pressure up to 500 kPa and reaction temperature of 425° to 650° C. for less than 50 wt % partial feedstock cracking; thereby producing cracking effluent containing at least 20 wt % isomeric C4–C5 aliphatics including at least 10 wt % C4–C5 tertiary alkene, and at least 10 wt % C4–C5 isoalkane, based on C5- conversion product, with less than 20 wt % aromatics in the total cracking effluent;
separating cracking effluent to obtain an aliphatic fraction rich in tertiary C4–C5 alkene and a C6+ fraction; and
etherifying the C4–C5 tertiary alkene by catalytic reaction with $C_1$–$C_4$ lower alkanol to produce tertiary-alkyl ether product.

25. The process of claim 24 wherein said catalyst material has a hexagonal arrangement of uniformly-spaced pore with at least 13 Angstroms diameter, and having a hexagonal electron diffraction pattern that can be indexed with a $d_{100}$ value greater than 18 Angstrom units; and wherein said alkene comprises at least one C3–C6 alkene; and wherein said catalyst consists essentially of metallosilicate comprising tetrahedrally coordinated Al, Ga or Fe atoms.

26. The process of claim 25 wherein said catalyst material consists essentially of aluminosilicate having the structure of MCM-41; wherein reaction temperature is 425° to 650° C.; and eight hourly space velocity is 1 to 50, based on active-catalyst.

27. The process of claim 25 wherein said catalyst material consists essentially of metallosilicate having hexagonal honeycomb lattice structure consisting essentially of uniform pores in the range of 20 to 100 Angstroms.

28. The process of claim 24 including the additional step of converting C4–C5 isoalkane to provide high octane fuel components.

* * * * *

UNITED STATES PATENT AND TRADEMARK OFFICE
CERTIFICATE OF CORRECTION

PATENT NO. : 5,232,580
DATED : August 3, 1993
INVENTOR(S) : Le et al.

It is certified that error appears in the above-identified patent and that said Letters Patent is hereby corrected as shown below:

Col. 28, line 54, "form" should be --from--.
Col. 30, line 8, delete "450˙ to" and replace with --500˙--.
Col. 30, line 58, delete "eight" and replace with --weight--

Signed and Sealed this

Fifth Day of April, 1994

Attest:

BRUCE LEHMAN

Attesting Officer

Commissioner of Patents and Trademarks